United States Patent
Benning

[15] 3,666,133
[45] May 30, 1972

[54] RADIATION-INITIATED, SELF-SEALING SYSTEM FOR SPACECRAFT

[72] Inventor: Calvin J. Benning, Mahwah, N.J.
[73] Assignee: W. R. Grace & Co., New York, N.Y.
[22] Filed: June 5, 1969
[21] Appl. No.: 830,742

[52] U.S. Cl.................................220/15, 204/159, 204/18, 204/159.2 A, 220/63 A, 260/37 N, 260/41 A, 260/77.5 R, 260/79, 260/857, 260/858, 260/860, 260/874, 260/885, 260/887, 260/888, 260/890, 260/893, 260/896, 260/897
[51] Int. Cl.................................................B65d 25/00
[58] Field of Search.....................220/15, 63 A; 204/159.24

[56] References Cited

UNITED STATES PATENTS

| | | | |
|---|---|---|---|
| 3,352,771 | 11/1967 | Anspan | 204/159.23 |
| 3,291,333 | 12/1966 | House | 220/15 |
| 3,030,344 | 4/1962 | Argabright et al. | 204/159.24 |

*Primary Examiner*—Murray Tillman
*Assistant Examiner*—Richard B. Turer
*Attorney*—Kenneth E. Prince

[57] ABSTRACT

A space vehicle containing a double-walled closure can be made self-sealing by placing a viscous photocurable material (can be slightly pressurized) in the hollow portion of the double-walled closure. When a meteorite pierces both walls, the internal pressure forces some of the photocurable material into the hole in the outer wall. A seal is rapidly formed as the photocurable material is photocured by ultraviolet light into a hardened substance.

9 Claims, 4 Drawing Figures

PATENTED MAY 30 1972  3,666,133

INVENTOR
CALVIN J. BENNING

BY  *Virgil H. Marsh*

ATTORNEYS

RADIATION-INITIATED, SELF-SEALING SYSTEM FOR SPACECRAFT

BACKGROUND OF THE INVENTION

1. Objectives of the Invention

An objective of the present invention is to provide a self-sealing construction for space vehicles capable of maintaining a life-supporting atmosphere therein throughout long exposure to celestial conditions. Other objectives will be apparent to those skilled in the art.

2. Prior Art

U.S. Pat. No. 3,291,333 discloses a hollow-walled closure unit housing a two-component system wherein the components will be separately maintained until such time as the unit is penetrated, whereupon the components will intermix and react to form a seal of the opening formed by such penetration. One of such components is a fluid capable of polymerization by molecular cross-linking or molecular extension such as a liquid diisocyanate. The other component is a cross-linking agent, foaming agent or catalyst, likewise in liquid form, which, when exposed to the first component, will cause such first component to polymerize. Such components are maintained in a double-walled enclosure and are held apart by a third wall or membrane interiorly thereof until at least this membrane is pierced by a meteoroid, at which time the two components will come in contact under pre-determined conditions of rate and proportion so as to effect a coagulation or polymerization into a tough, non-flowing substance capable of sealing the puncture against loss of pressure from within the vehicle. The proportions to which and the rate at which the reactive components come together to form such a seal is controlled in a preferred embodiment by a relatively elastic and tear-resistant separating membrane so as to minimize the size of the opening that will be made therethrough and by the employment of a relatively high-viscosity fluid, usually the polymerization material, toward the outer or vacuum side of the vehicle and of a relatively low-viscosity material, usually the catalyst, inwardly or toward the pressurized side of the vehicle.

Other systems consisting of balloons, compressed foams and liquid elastomers have been tested and show poor reliability. One system consists of polyvinyl acetate emulsion and expanded styrene beads contained in an elastomeric bladder. Also when a micrometeorite (1/32 to 1/8 inch in diameter) hits the structure at hypervelocities of up to 20,000 feet per second, the pellet can be trapped by urethane foam but the wall of the structure is left ruptured.

BROAD DESCRIPTION OF THE INVENTION

A space vehicle containing a hollow-walled closure can be made self-sealing by placing a viscous photocurable material in the hollow closure. When a meteorite pierces both walls, the internal pressure in the spacecraft forces some of the photocurable material into the hole in the outer wall. If necessary, the viscous photocurable material can be slightly pressurized when it is sealed into hollow-walled closure. A seal is rapidly formed as the photocurable material is photocured by ultraviolet light into a hardened substance.

DETAILED DESCRIPTION OF THE INVENTION

This invention may be more clearly understood by reference to the following detailed description of certain preferred embodiments:

Figure 1:
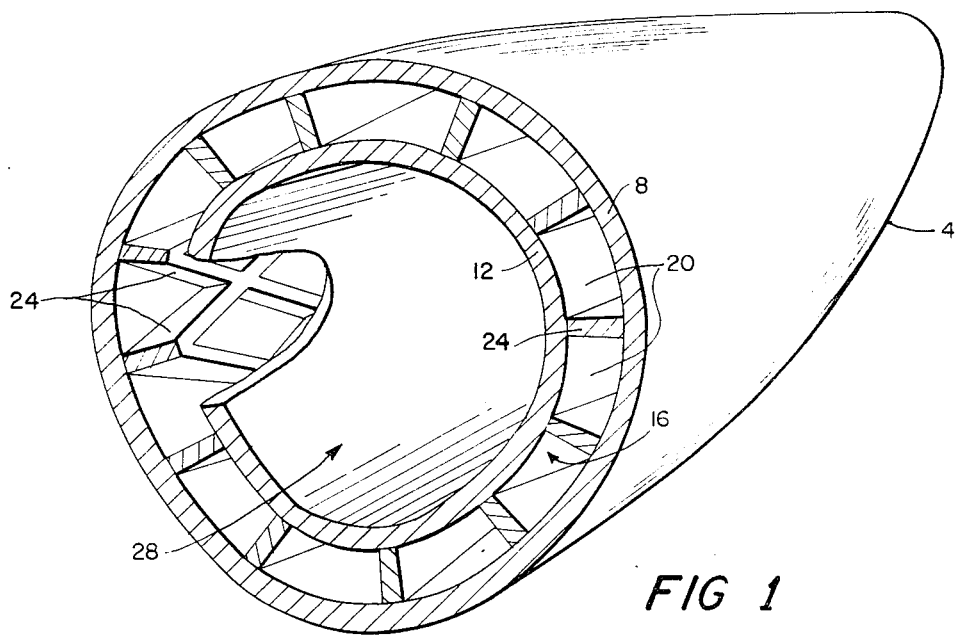
FIG. 1 is a fragmentary perspective view partially broken away and in partial cross section of a space vehicle having a self-sealing wall construction according to the present invention.

Spacecraft 4 is partially illustrated in FIG. 1. Outer wall 8 and inner wall 12 are so positioned in relation to each other that hollow-wall unit (enclosure 16) is formed over the surface of spacecraft 4 (except where sensing devices, etc., protrude). Enclosure 16 can have any desired shape and, preferably, is constructed of a rigid metallic material. The photocurable composition is contained in enclosure 16 and is a medium-to-high viscosity liquid. Enclosure 16, as shown, is preferably divided into a series of subchambers 20 by means of dividers 24, which are preferably arranged in an interconnecting, criss-crossed arrangement forming a honeycomb structure. In that manner, any opening in a chamber wall will expose only a relatively small quantity of the fluid within the entire chamber so that the dimensional stability of the closure unit and the spatial relationship of its components will be substantially maintained throughout the stresses and strains of its space flight.

It is understood that interior portion 28 enclosed by the sealing wall construction will be pressurized in relationship to the surrounding environment. To provide a controlled atmosphere capable of comfortably supporting human life without spacesuits, the pressure will be on the order of 14.7 pounds per square inch absolute so as to approximate the conditions of the earth's atmosphere at sea level. When spacesuits are used, the cabin pressure will normally be on the order of 6 to 8 psia. When the vehicle is passing through celestial space, however, it will be further understood that a substantially complete vacuum (e.g., less than $1 \times 10^{-9}$ torr) will surround its exterior.

Figures 2, 3, 4:
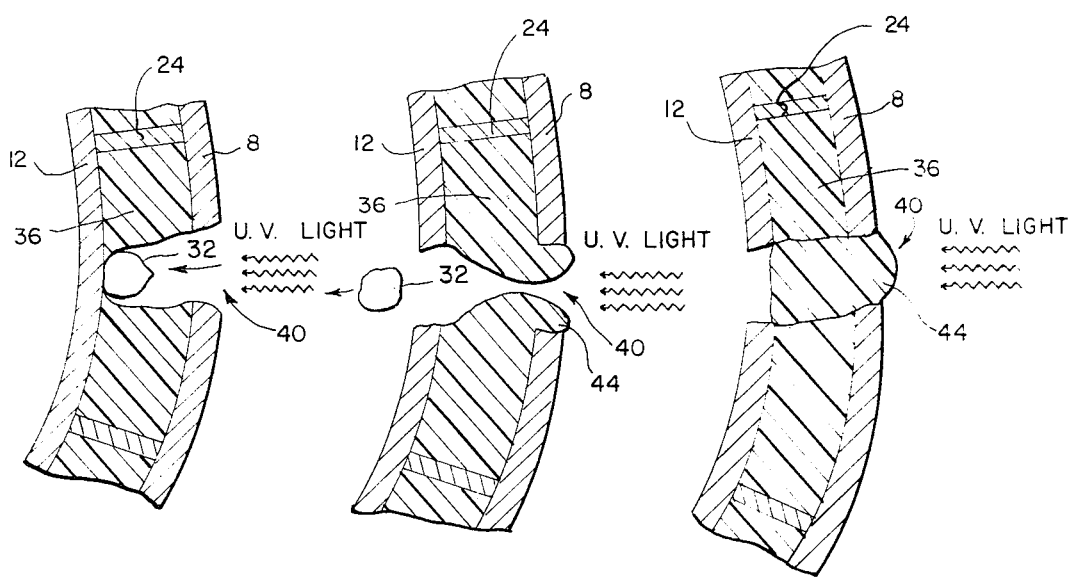
FIG. 2 is an enlarged fragmentary cross-sectional view of a hollow-walled closure unit according to the present invention as it appears under the influence of a projectile in the process of passing therethrough, immediately prior to the penetration of the inner wall.
FIG. 3 is an enlarged cross-sectional view of the construction of FIG. 2 immediately following the passage of the projectile therethrough.
FIG. 4 is an enlarged cross-sectional view of the wall unit of FIGS. 2 and 3 illustrating the seal that is formed against the opening formed by the passage of the projectile.

Referring to FIGS. 2 and 3, it can be seen that after high-velocity particle 32 (e.g., a micrometeorite) passes through walls 8 and 12, the relatively greater atmospheric pressure within the vehicle and adjacent inner wall 12 will tend to escape through the wall opening toward the vacuum exterior of outer wall 8 and will start to force or carry photocurable composition 36 out of hole 40 in outer wall 8. Ultraviolet light encountered in orbit around the earth and the other planets of this solar system or celestial travel near this solar system rapidly photocures photocurable composition 36. The photocured material is represented as 44. Referring to FIG. 4, it is seen that photocured material 44 air-tightly seals hole 40. The photocuring is extremely rapid provided that U.V. light is available. As time proceeds the seal becomes more substantial due to the fact that the photocure progressively occurs at a greater depth in the seal-forming material.

The crucial ingredients in the photocurable composition are:

1. about 2 to about 98 parts by weight of an ethylenically unsaturated polyene containing two or more reactive carbon-to-carbon bonds;
2. about 98 to about 2 parts by weight of a polythiol; and
3. about 0.0005 to about 50 parts by weight, based on 100 parts by weight of (1) and (2), of a photocuring rate accelerator. The reactive carbon-to-carbon bonds of the polyenes are preferably located terminally, near terminally, and/or pendant from the main chain. The polythiols, preferably, contain two or more thiol groups per molecule. The usable photocurable compositions are liquid at over the temperature range encountered by a spacecraft.

Included in the term "liquid", as used herein, are those photocurable compositions which in the presence of inert solvent, aqueous dispersion or placticizer have a viscosity ranging from essentially zero to 20 million centipoises at 70° F.

As used herein polyenes and polyynes refer to simple or complex species of alkenes or alkynes having a multiplicity, i.e., at lest 2, "reactive" carbon-to-carbon unsaturated functional groups per average molecule. For example, a diene is a polyene that has two "reactive" carbon-to-carbon double bonds per average molecule, while a diyne is a polyyne that contains in its structure two "reactive" carbon-to-carbon triple bonds per average molecule. Combinations of "reactive" double bonds and "reactive" triple bonds within the same molecule are also operable. An example of this is monovinylacetylene, which is a polyeneyne under our definition. For purposes of brevity all these classes of compounds will be referred to herein as polyenes.

As used herein the term "reactive" unsaturated carbon-to-carbon groups means group which will react under proper conditions as set forth herein with thiol groups to yield the thioether linkage

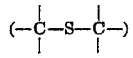

as contrasted to the term "unreactive" carbon-to-carbon unsaturation which means

groups found in aromatic nuclei (cyclic structures exemplified by benzene, pyridine, anthracene, and the like) that do not react under the same conditions with thiols to give thioether linkages. In the instant invention, products from the reaction of polyenes with polythiols which contain 2 or more thiol groups per average molecule are called polythioether polymers or polythioethers.

Methods of preparing various polyenes useful within the scope of this invention are disclosed in copending application Ser. No. 674,773, filed Oct. 12, 1967, and assigned to the same assignee. Some of the useful polyenes are prepared in the detailed example set forth in the following specification.

One group of polyenes operable in the instant invention is that taught in a copending application having Ser. No. 617,801; inventors: Kehr and Wszolek; filed: Feb. 23, 1967, and now abandoned; and assigned to the same assignee. This group includes those having a molecular weight in the range of 50 to 20,000, a viscosity ranging from 0 to 20 million centipoises at 130° C., and of the general formula: [A]—(X)$_m$, wherein X is a member of group consisting of

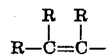

and R—C ≡ C—; $m$ is at least 2; R is independently selected from the group consisting of hydrogen, halogen, and an organic compound selected from the group consisting of aryl, substituted aryl, aralkyl, substituted aralkyl, cycloalkyl, substituted cycloalkyl, alkyl, and substituted alkyl groups containing one to 16 carbon atoms; and A is a polyvalent organic moiety free of (1) reactive carbon-to-carbon unsaturation and (2) unsaturated groups in conjugation with the reactive ene or yne groups in X. Thus A may contain cyclic groupings and minor amounts of hetero atoms such as N, S, P or O but containing primarily carbon-carbon, carbon-oxygen or silicon-oxygen containing chain linkages without any reactive carbon-to-carbon unsaturation. This group preferably has a molecular weight over 300.

In this first group, the polyenes are simple or complex species of alkenes or alkynes having a multiplicity of pendant, terminally or near terminally positioned "reactive" carbon-to-carbon unsaturated functional groups per average molecule. As used herein for determining the position of the reactive functional carbon-to-carbon unsaturation, the term "terminal" means that said functional unsaturation is at an end of the main chain in the molecule; whereas the term "near terminal" means that the functional unsaturation is not more than 16 carbon atoms away from an end of the main chain in the molecule. The term "pendant" means that the reactive carbon-to-carbon unsaturation is located terminally in a branch of the main chain as contrasted to a position at or near the ends of the main chain. For purposes of brevity all of these positions will be referred to generally as "terminal" unsaturation.

The liquid polyenes operable in this first group contain one or more of the following types of non-aromatic and non-conjugated "reactive" carbon-to-carbon unsaturation:

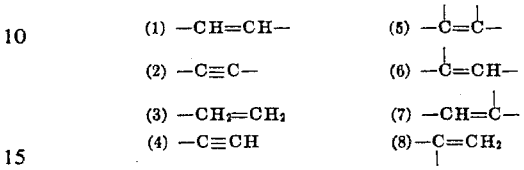

These functional groups as shown in 1–8 supra are situated in a position either which is pendant, terminal or near terminal with respect to the main chain but are free of terminal conjugation. As used herein the phrase "free of terminal conjugation" means that the terminal "reactive" unsaturated groupings may not be linked directly to non-reactive unsaturated species such as

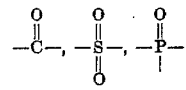

and the like so as to form a conjugated system of unsaturated bonds exemplified by the structure

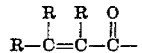

etc. On the average the polyenes must contain 2 or more "reactive" unsaturated carbon-to-carbon bonds per molecule and have a viscosity in the range from slightly above 0 to about 20 million centipoises at 70° C. Included in the "polyenes" as used herein are those materials which in the presence of an inert solvent, aqueous dispersion or plasticizer fall within the viscosity range set out above at 70° C. Operable polyenes in the instant invention have molecular weights in the range of about 50 to about 20,000, preferably about 500 to about 10,000.

Examples of operable polyenes from this first group include, but are not limited to:

1. Crotyl-terminated polyurethanes which contain two "reactive" double bonds per average molecule in a near terminal position of the average general formula:

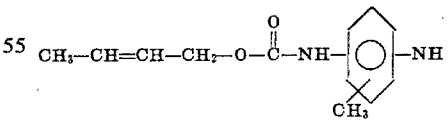

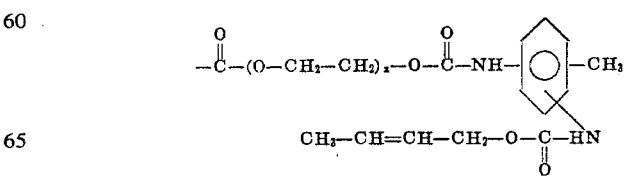

wherein $x$ is at least 1.

2. Ethylene/propylene/non-conjugated diene terpolymers, such as "Nordel 1040" manufactured by E. I. duPont de Nemours & Co., Inc., which contain pendant "reactive" double bonds of the formula: —CH$_2$—CH CH—CH$_3$.

3. The following structure which contains terminal "reactive" double bonds:

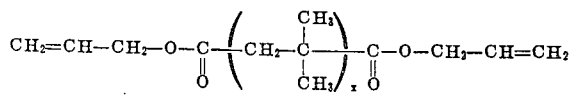

wherein x is at least 1.

4. The following structure which contains near terminal "reactve" double bonds:

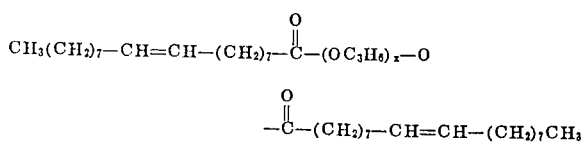

wherein x is at least 1.

Another, or second, group of operable polyenes includes those unsaturated polymers in which the double or triple bonds occur primarily within the main chain of the molecules. Examples include conventional elastomers (derived primarily from standard diene monomers) such as polyisoprene, polybutadiene, styrene-butadiene rubber, isobutylene-isoprene rubber, polychloroprene, styrene-butadiene-acrylonitrile rubber and the like; and unsaturated polyesters, polyamides and polyurethanes derived from monomers containing "reactive" unsaturation, e.g., adipic acid-butenediol, 1,6-hexanediamine-fumaric acid and 2,4-tolylene diisocyanate-butenediol condensation polymers and the like.

A third group of polyenes operable in this invention includes those polyenes in which the reactive unsaturated carbon-to-carbon bonds are conjugated with adjacent unsaturated groupings. Examples of operable conjugated reactive ene systems include but are not limited to the following:

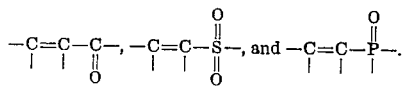

A few typical examples of polymeric polyenes which contain conjugated reactive double bond groupings such as those described above are poly(oxyethylene) glycol (600 M.W.) acrylate; poly(oxytetramethylene) glycol (1,000 M.W.) dimethacrylate; the triacrylate of the reaction product of trimethylol propane with 20 moles of ethylene oxide; and the like.

As used herein, the term polythiols refers to simple or complex organic compounds having a multiplicity of pendant or terminally positioned —SH functional groups per average molecule.

On the average the polythiols must contain 2 or more —SH groups per molecule. They usually have a viscosity range of slightly above 0 to about 20 million centipoises (cps) at 70° C. as measured by a Brookfield Viscometer. Included in the term "polythiols" as used herein are those materials which in the presence of an inert solvent, aqueous dispersion or plasticizer fall within the viscosity range set out above at 70° C. Operable polythiols in the instant invention usually have molecular weights in the range of about 50 to about 20,000 or more, preferably about 100 to about 10,000.

The polythiols operable in the instant invention can be exemplified by the general formula: $R_a$—$(SH)_n$, wherein $n$ is at least 2 and $R_a$ is a polyvalent organic moiety free from "reactive" carbon-to-carbon unsaturation. Thus $R_a$ may contain cyclic groupings and minor amounts of hetero atoms such as N, S, P or O but primarily contains carbon-hydrogen, carbon-oxygen, or silicon-oxygen containing chain linkages free of any "reactive" carbon-to-carbon unsaturation.

One class of polythiols operable with polyenes in the instant invention to obtain essentially odorless compositions are esters of thiol-containing acids of the general formula: HS—$R_b$—COOH, wherein $R_b$ is an organic moiety containing no "reactive" carbon-to-carbon unsaturation with polyhydroxy compounds of the general structure: $R_c$—$(OH)_n$, wherein $R_c$ is an organic moiety containing no "reactive" carbon-to-carbon unsaturation with polyhydroxy compounds of the general structure: $R_c$—$(OH)_n$, wherein $R_c$ is an organic moiety containing no "reactive" carbon-to-carbon unsaturation and $n$ is 2 or greater. These components will react under suitable conditions to give a polythiol having the general structure:

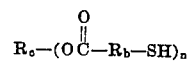

wherein $R_b$ and $R_c$ are organic moieties containing no "reactive" carbon-to-carbon unsaturation and $n$ is 2 or greater.

Certain polythiols, such as the aliphatic monomeric polythiols (ethane dithiols, hexamethylene dithiol, decamethylene dithiol, tolylene-2,4-dithiol, etc.), some polymeric polythiols, such as a thiol-terminated ethylcyclohexyl dimercaptan polymer, etc., and similar polythiols which are conveniently and ordinarily synthesized on a commercial basis, although having obnoxious odors, are operable in this invention. Examples of the polythiol compounds preferred for this invention because of their relatively low odor level and fast curing rate include, but are not limited to, esters of thioglycolic acid (HS—$CH_2COOH$), α-mercaptopropionic acid (HS—$CH(CH_3)$—COOH) and β-mercaptopropionic acid (HS—$CH_2CH_2COOH$) with polyhydroxy compounds such as glycols, triols, tetraols, pentaols, hexaols, etc. Specific examples of the preferred polythiols include but are not limited to ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis(thioglycolate) and pentaerythritol tetrakis (β-mercaptopropionate), all of which are commercially available. A specific example of a preferred polymeric polythiol is poly(propylene ether) glycol bis(β-mercaptopropionate) prepared from poly(propylene ether) glycol (e.g., Pluracol P2010, Wyndotte Chemical Corp.) and β-mercaptopripionic acid by esterification.

The preferred polythiol compounds are characterized by a low level of mercaptan-like odor initially, and after reaction give essentially odorless cured polythioether end products which are commercially useful resins or elastomers for printing plates.

As used herein the term "odorless" means the substantial absence of the well-known offensive and sometimes obnoxious odors that are characteristic of hydrogen sulfide and the derivative family of compounds known as mercaptans.

The term "functionality" as used herein refers to the average number of ene or thiol groups per molecule in the polyene and/or the polythiol. For example, a triene is a polyene with an average of three "reactive" carbon-to-carbon unsaturated groups per molecule and thus has a functionality of 3. A polymeric dithiol is a polythiol with an average of two thiol groups per molecule and thus has a functionality of 2.

It is further understood and implied in the above definitions that in these systems the functionality of the polyene and polythiol component is commonly expressed in whole numbers although in practice the actual functionality may be fractional. For example, a polyene component having a nominal functionality of 2 (from theoretical considerations alone) may in fact have an effective functionality of somewhat less than 2. Such a product is useful in the instant invention and is referred to herein as having a functionality of 2.

To obtain the maximum strength, resistance to low atmospheric pressures, heat resistance and freedom from tackiness, the reaction components consisting of the polyenes and polythiols of this invention generally are formulated in such a manner as to give solid, cross-linked, three-dimensional network polythioether polymer systems on curing. In order to achieve such infinite network formation, the individual polyenes and polythiols must each have a functionality of at least 2 and the sum of the functionalities of the polyene and polythiol components must always be greater than 4. Blends and mixtures of the polyenes and the polythiols containing such functionality are also operable herein.

The photocuring reaction can be initiated by U.V. radiation contained in actinic radiation from sunlight or obtained from special light sources which emit significant amounts of U.V.

light. (Useful U.V. radiation generally has a wavelength in the range of about 2,000 to about 4,000 angstrom units.) Thus it is possible merely to expose the polyene and polythiol admixture to actinic radiation under ambient conditions or otherwise and obtain a cured solid elastomeric or resinous product useful as a plugging material. But this approach to the problem results in extremely long exposure times which cause the process in the vast bulk of applications to be commercially unfeasible. Chemical photocuring rate accelerators (photo-initiators, -sensitizers or -activators) e.g., methyl ethyl ketone, etc., serve to drastically reduce the exposure time and thereby when used in conjunction with various forms of energetic radiation (containing U.V. radiation) yield very rapid, practical photocures by the practice of the instant invention. Useful photocuring rate accelerators include benzophenone; acetophenone; acenaphthene-quinone; methyl ethyl ketone; thioxanthen-9-one; xanthen-9-one; 7-H-Benz [de] anthracen-7-one; dibenzosuberone; 1-naphthaldehyde; 4,4'-bis(dimethylamino) benzophenone; fluorene-9-one; 1'-acetonaphthone; 2'-acetonaphthone; 2,3'-butanedione; anthraquinone; 1-indanone; 2-tert-butyl anthraquinone; valerophenone; hexanophenone; 8-phenylbutyrophenone; p-morpholinopropiophenone; 4-morpholinobenzophenone; 4'morpholinodesoxybenzoin; p-diacetylbenzene; 4-amino-benzophenone; 4'-methoxyacetophenone; benzaldehyde; α-tetralone; 9-acetylphenanthrene; 2-acetylphenanthrene; 10-thioxanthenone; 3-acetylphenanthrene; 3-acetylindole; 1,3,5-triacetylbenzene; etc., and blends thereof. The photoinitiators are added in an amount ranging from about 0.0005 to about 50 percent by weight of the polyene and polythiol components in the instant invention. Benzophenone is the preferred photocuring rate accelerator.

In many instances, rapidity of sealing is crucial, hence the speed of the photocuring is crucial. The photocuring rate accelerator should be elected with that factor in mind.

The compositions to be photocured, in accord with the present invention, may, if desired, include such additives as antioxidants, inhibitors, activators, fillers, antistatic agents, flame-retardant agents, thickeners, thixotropic agents, surface-active agents, viscosity modifiers, plasticizers, and the like within the scope of this invention. Such additives are preblended with the polyene or polythiol prior to placing the final composition in the wall chambers. The aforesaid additives may be be present in quantities up to 500 parts or more per 100 parts photocurable composition by weight and preferably 0.005 and 300 parts on the same basis. The type and concentration of the additives must be selected with great care so that the final composition remains photocurable under conditions of exposure encountered in space, etc.

The compounding of the components prior to photocuring can be carried out in any conventional manner which takes into account that the material is sensitive to U.V. radiation. This composition generally can be stored in the dark for extended periods of time, which makes it ideal for use in extended spacecraft orbitings, etc.

The photocurable composition should be a viscous liquid at room temperature. The viscosity should range between about 50 and about 200,000 poises in the temperature range of 0° to 130° C. The temperature of materials used in orbiting, etc., spacecraft can be extremely wide. The term liquid includes suspensions, etc. (The viscosity of the polyenes and polythiols was measured on a Brookfield Viscometer at 30°, 70° or 130° C. in accord with the instructions therefor.)

The following examples will aid in explaining, but should not be deemed as limiting, the instant invention. In all cases, unless otherwise noted, all parts and percentages are by weight.

EXAMPLE 1

3456.3 gm. (1.75 mole) of poly(propylene ether) glycol, commercially available under the trade name "PPG 2025" from Union Carbide, and 1.7 gm. of di-n-butyl tin dilaurate were placed in a 5-liter, round-bottom, 3-neck flask. The mixture in the flask was degassed at 110°C. for 1 hour and was then cooled to 25° C. by means of an external water bath. 207 gm. (3.50 moles) of allyl alcohol was added with stirring to the flask. 609.0 gm. (3.50 moles) of an 80–20 percent isomer mixture of tolylene-2,4-diisocyanate and tolylene-2,6-diisocyanate, respectively, sold under the trade name "Mondur TD 80", was charged to the flask. The mixture was stirred well. The flask was cooled by the water bath during this period. Eight minutes after the "Mondur TD 80" was added the temperature of the mixture was 59° C. After 20 minutes the NCO content was 12.39 mg. NCO/gm; after 45 minutes it was 9.87 mg. NCO/gm; and after 75 minutes it was 6.72 mg. NCO/gm. The water bath was removed 80 minutes after the "Mondur RD 80" had been added, the temperature of the mixture being 41° C., and heat was applied until the mixture temperature reached 60° C. That temperature was maintained 105 minutes after the "Mondur TD 80" was added, the NCO content was 3.58 mg. NCO/gm.; after 135 minutes it was 1.13 mg. NCO/gm.; and after 195 minutes it was 0.42 mg. NCO/gm. At that point in time the resultant polymer composition was heated to 70° C. and vacuum-stripped for 1 hour. The resultant polymer composition was labeled composition 1 and had a viscosity of 16,000 cps. as measured on a Brookfield Viscometer at 30° C. Unless otherwise stated, all the viscosity measurements were made on a Brookfield Viscometer at 30° C.

The above procedure was repeated five times, and resultant compositions were labeled compositions 2 through 6, respectively. The heating step lasted 180 minutes, 140 minutes, 140 minutes, 205 minutes, and 180 minutes, respectively. With composition 2 the temperature was 60° C. after 8 minute; with composition 3 the temperature was 57° C. after 6 minutes; with composition 4 the temperature was 41° C. after 20 minutes, at which time the temperature was raised and held at 60° C.; with composition 5 the temperature was 57.5° C. in 8 minutes, was 42° C. in 40 minutes, the taken up to 60° C. and lowered to 58° C. after 120 minutes; and with composition 6 the temperature was 57° C. in 6 minutes, and was 41° C. after 60 minutes, at which time the temperature was immediately raised to 60° C. The viscosity of the resultant polymer compositions was 15,500 cps.; 16,000 cps.; 17,000 cps.; and 16,800 cps.; and 16,200 cps., respectively.

Compositions 1, 2, 3, 4, 5, and 6 were placed in a 6-gallon container and stirred well. The resultant polymer composition had a viscosity of 16,600 cps. and the NCO content was 0.01 mg. NCO/gm. This composite polymer composition was labeled polymer A.

100 parts of polymer A, 10 parts of polythiol A, 15 parts of Hi-Sil 233 (a fine particle silica reinforcing filler and thickening agent commercially available from the Columbia-Southern Division of PPG Industries, Inc.), and 0.5 part of benzophenone were thoroughly admixed. This resulted in photocurable composition A. Polythiol A was pentaerythritol tetrakis (β-mercaptopropionate) which is commercially available under the trade name "0–43 Ester" (sold by Carlisle Chemical Company).

Photocurable composition A was placed in a hollow-walled enclosure similar to the one shown in the Figures. The structure containing the hollow-walled enclosure was placed in a vacuum chamber. The internal pressure of the system was 14.7 psia. and the external pressure was $1 \times 10^{-6}$ torr. The external wall of the system was irradiated with ultraviolet light from one Westinghouse RS 275 watt sunlamp at a distance of 3 inches. A particle (steel, having a diameter of 0.03 inch) was shot through the hollow wall. The initial velocity of the particle was about 500 feet per second. The particle punctured both walls. The photocurable composition entered the hole in the outer wall and completely formed a hardened, photocured plug in less than 30 seconds.

EXAMPLE 2

Example 1 was repeated, except polymer B was used. Polymer B was a polyester (M.W. = 2,000) made up of diethylene glycol, adipic acid, and 3 percent pentaerythritol (OH number is 60). Polymer B had a negligible acid number and was reacted with 2.2 equivalents of tolylene diisocyanate. The isocyanate-terminated resin was reacted with the stoichiometric amount of allyl alcohol relative to the isocyanate groups to produce a polymer with terminal double bonds. A hardened, photocured plug was obtained in about 15 to 20 seconds.

EXAMPLES 3 TO 6

Example 1 was repeated four times, except that the pentaerythritol tetrakis($\beta$-mercaptopropionate) was replaced with trimethylolpropane tris($\beta$-mercaptopropionate) (10 parts); trimethylolpropane tris(thioglycolate) (15 parts); pentaerythritol tetrakis(thioglycolate) (15 parts); and polypropylene ether glycol bis($\beta$-mercaptopropionate) (5 parts), respectively. Hardened, photocured plugs were obtained.

EXAMPLE 7

Example 1 was repeated, except that half of the pentaerythritol tetrakis($\beta$-mercaptopropionate) was replaced with 7.5 parts of ethylene glycol bis($\beta$-mercaptopropionate).

A hardened, photocured plug was obtained in about 30 to 40 seconds.

EXAMPLE 8

Example 1 was repeated except that 60 parts of polymer C was used in place of polymer A. Polymer C was prepared as follows: 485 gm. (0.23 mole) of a commercially available liquid polymeric diisocyanate, sold under the trade name "Adiprene L-100" by E. I. duPont de Nemours & Co., was charged to a dry resin kettle maintained under a nitrogen atmosphere and equipped with a condenser, stirrer, thermometer, and gas inlet and outlet. 37.8 gm. (0.65 mole) of allyl alcohol was charged to the kettle and the reaction was continued for 17 hours with stirring at 100° C. Thereafter the nitrogen atmosphere was removed and the kettle was evacuated 8 hours at 100° C. 50 cc. dry benzene was added to the kettle and the reaction product was azeotroped with benzene to remove the excess unreacted alcohol. This allyl-terminated liquid polymer has a molecular weight of approximately 2,100 and was labeled polymer C.

A hardened, photocured plug was obtained in about 15 seconds.

EXAMPLE 9

Example 1 was repeated except that 100 parts of polymer D was used in place of polymer A. Polymer D was prepared as follows: 1,500 gm. (0.47 mole) of a linear solid polyester diol having a molecular weight of 3,200 and commercially available from Hooker Chemical Corp. under the trade name "Rucoflex S—1011—35" was charged to a 3-liter, 3-necked flask, and heated to 110° C. under vacuum and nitrogen for 1 hour with stirring. 83 gm. of allyl isocyanate having a molecular weight of 83.1 and commercially available from Upjohn Co. was added to the flask along with 0.3 cc. of dibutyl tin dilaurate (catalyst), commercially available from J. T. Baker. The reaction was continued at 110° C. with stirring for 1 hour. This allyl-terminated liquid polymer was labeled polymer D.

A hardened, photocured plug was obtained in about 30 seconds.

EXAMPLES 10 TO 15

Example 1 was repeated six times, except that the benzophenone was replaced with cyclohexane (0.5 part); acetone (1 part); methyl ethyl ketone (0.3 part); dibenzosuberone (2 parts); a blend of acetone (0.3 part) and p-diacetylbenzene (0.6 part); and 3-acetylphenanthrene (1 part), respectively. Hardened, photocured plugs were obtained.

EXAMPLE 16

This example illustrates the use of monomeric polythiol and a monomeric polyene. 23.8 gm. of pentaerythritol tetrakis($\beta$-mercaptopropionate); 25.6 gm. of the reaction product of one mole of 1,4-butanediol with 2 moles of allyl isocyanate; 7 gm. of Hi-Sil 233; and 0.5 gm. of benzophenone were thoroughly admixed. Example 1 was repeated, except that the above photocurable composition was used in place of photocurable composition A.

A hardened, photocured plug was obtained in less than 60 seconds.

EXAMPLE 17

This example illustrates the use of a reactive ene group conjugated with another double bond grouping (C=O). 27 gm. of the triacrylate of the reaction product of one mole of trimethylol propane with 20 moles of ethylene oxide; 9 gm. of pentaerythritol tetrakis ($\beta$-mercaptopropionate); 5 gm. of Hi-Sil 233; and 0.5 gm. of benzophenone were admixed. Example 1 was repeated, except that the above photocurable composition was used in place of photocurable composition A.

A hardened, photocured plug was obtained in less than 60 seconds.

EXAMPLE 18

50 gm. of a liquid polybutadiene derivative having a molecular weight of 220 and a double bond distribution consisting of about 60 percent trans-1,5, about 20 percent cis-1,4, and about 20 percent vinyl-1,2, and which is is commercially available from Sinclair Petrochemicals, Inc., name "Poly B-D-R 45-M"; 5 gm. of pentaerythritol tetrakis($\beta$-mercaptopropionate); and 0.5 gm. of benzophenone were admixed. Example 1 was repeated, except that the above photocurable composition was used in place of photocurable composition A.

A hardened, photocured plug was obtained in less than 60 seconds.

EXAMPLE 19

10 gm. of "Gentro 1002" (which is the trade name for a solid SBR rubber which is commercially available from General Tire and Rubber Co.), which was dissolved in 50 gm. of decalin (as a solvent); 1 gm. of pentaerythritol tetrakis($\beta$-mercaptopropionate); 0.5 gm. of benzophenone; and 0.1 gm. of Hi-Sil 233 silica added as a thickening agent were admixed. (Hi-Sil 233 is the trade name for finely divided silica filler having a particle size of 0.03 micron and is commercially available from PPG Industries, Inc.) Example 1 was repeated, except that the above photocurable composition was used in place of photocurable composition A.

A hardened, photocured plug was obtained in less than 60 seconds.

EXAMPLE 20

This example illustrates the use of a photocurable composition containing a monomeric polyene and a polymeric polythiol. 50 gm. of "Dion Polymercaptan Resin DPM–1002", which is a thiol terminated liquid polymer having a functionality of 2 to 3 and a molecular weight of about 5,000 and is commercially available from Diamond Alkali Company; 2.5 gm. of triallyl cyanurate; and 0.5 gm. of benzophenone were admixed. Example 1 was repeated, except that the above photocurable composition was used in place of photocurable composition A.

A hardened, photocured plug was obtained in less than 60 seconds.

EXAMPLE 21

This example illustrates the use of a photocurable composition containing a polymeric polyene and a polymeric polythiol. Example 1 was repeated, except that the photocurable composition contained 5 parts of the polymeric polyene used in Example 8; 10 parts of the polymeric polythiol used in Example 20; and 0.5 part of benzophenone.

A hardened, photocured plug was obtained in less than 60 seconds.

EXAMPLE 22

Example 1 was repeated, except that the viscous photocurable material was slightly pressurized when it was placed in the hollow-walled enclosure. A hardened, photocured plug was obtained in less than 30 seconds.

It is claimed:

1. A self-sealing construction for space vehicles comprising a walled closure unit consisting of an outer fluid-impervious wall and an inner fluid-impervious wall spaced from said outer wall, said walls forming an enclosed chamber; a high viscosity fluid in said enclosed chamber formed by said outer wall and inner wall, said fluid being a photocurable composition consisting essentially of 2 to 98 parts by weight of a polyene containing at least two reactive ene groups per molecule, 98 to 2 parts by weight of a polythiol containing at least two thiol groups per molecule, the combined functionality of said ene groups in the polyene and the thiol groups in the polythiol being greater than 4, and 0.0005 to 50 parts by weight based on 100 parts by weight of said polyene and said polythiol of a photocuring rate accelerator, said photocurable composition being hardened to an insoluble state when exposed to ultraviolet radiation, and subdividing means in combination with said walled closure unit for subdividing said enclosed chamber into a plurality of smaller compartments.

2. A self-sealing construction according to claim 1 wherein said subdividing means is a fluid-tight honeycomb structure.

3. A self-sealing construction according to claim 1 wherein said photocurable composition has a viscosity between about 100 poises and about 200,000 poises at a temperature between about 0° and about 130° C.

4. A self-sealing construction according to claim 1 wherein said polyene composition has a molecular weight in the range of 50 to 20,000; has a viscosity ranging from 0 to 20,000,000 centipoises at 70° C.; and has the general formula: $[A]-(X)_m$, wherein X is a member of the group consisting of

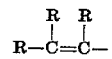

and $R-C \equiv C$; $m$ is an integer of at least 2; R is independently selected from the group consisting of hydrogen, halogen, and an organic compound selected from the group consisting of aryl, substituted aryl, aralkyl, substituted aralkyl, cycloalkyl, substituted cycloalkyl, alkyl, and substituted alkyl groups containing one to 16 carbon atoms; and A is a polyvalent polymeric organic moiety free of (1) reactive carbon-to-carbon unsaturation and (2) has unsaturated groupings in terminal conjugation with X.

5. A self-sealing construction according to claim 1 wherein the two, or more, reactive ene groups are located at the end of or pendant to the main chain of the molecule.

6. A self-sealing construction according to claim 1 wherein the two, or more, reactive ene groups are located within the main chain of the molecule.

7. A self-sealing construction according to claim 1 wherein the two, or more, reactive ene groups are conjugated with another unsaturated group.

8. A self-sealing construction according to claim 1 wherein said polythiol has a molecular weight between about 50 and about 20,000 and has a viscosity between slightly above zero and about 20,000,000 centipoises.

9. A self-sealing construction according to claim 1 wherein said photocurable composition is pressurized.

* * * * *